July 26, 1938. W. R. SCHOFIELD, JR 2,124,832
EXHIBITING INSTRUMENT
Filed July 24, 1935 2 Sheets-Sheet 1
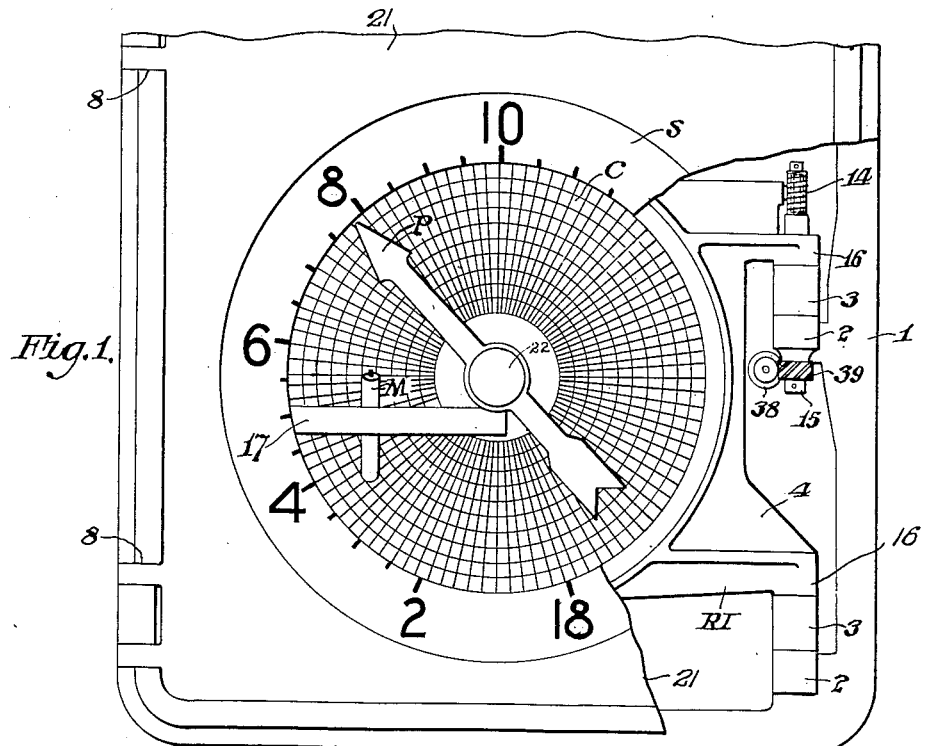
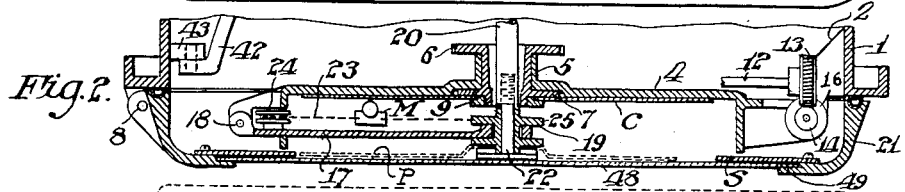
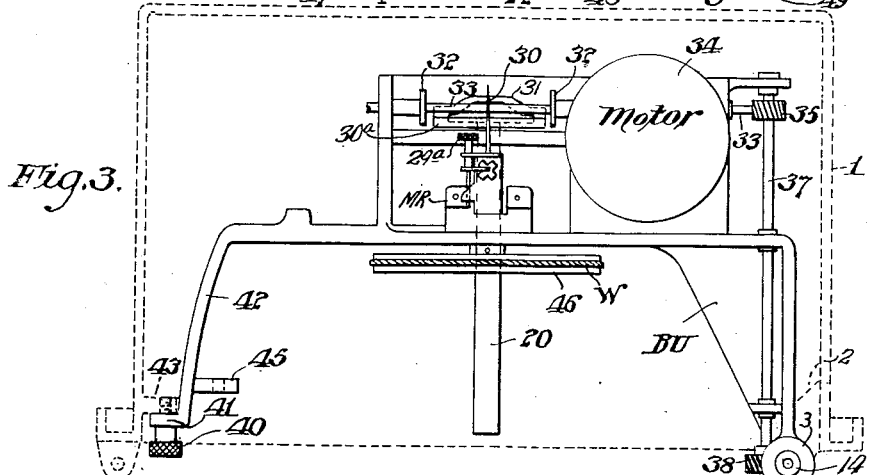
Inventor
William R. Schofield Jr
By Cornelius D. Ehret
Attorney.

July 26, 1938.  W. R. SCHOFIELD, JR  2,124,832
EXHIBITING INSTRUMENT
Filed July 24, 1935  2 Sheets-Sheet 2
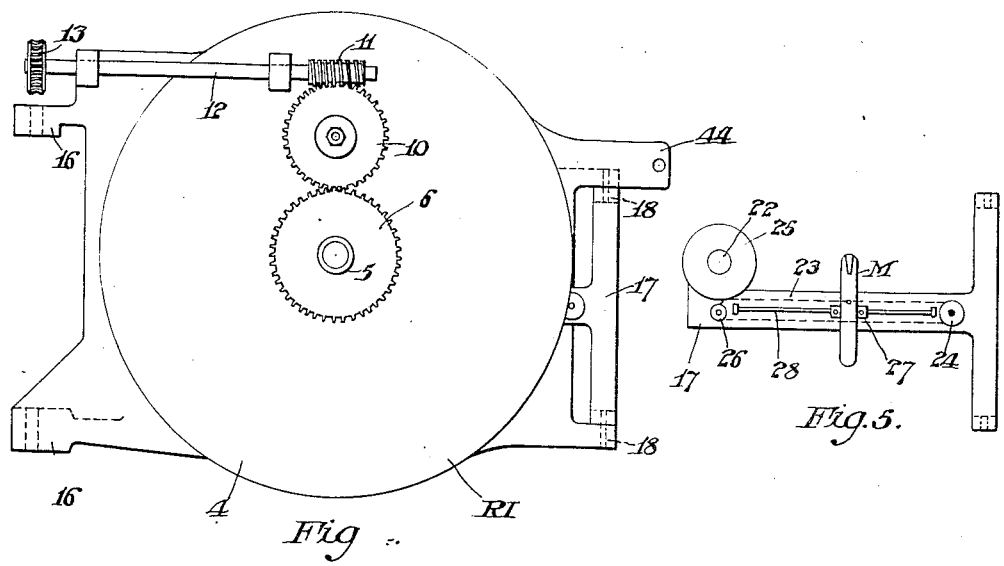
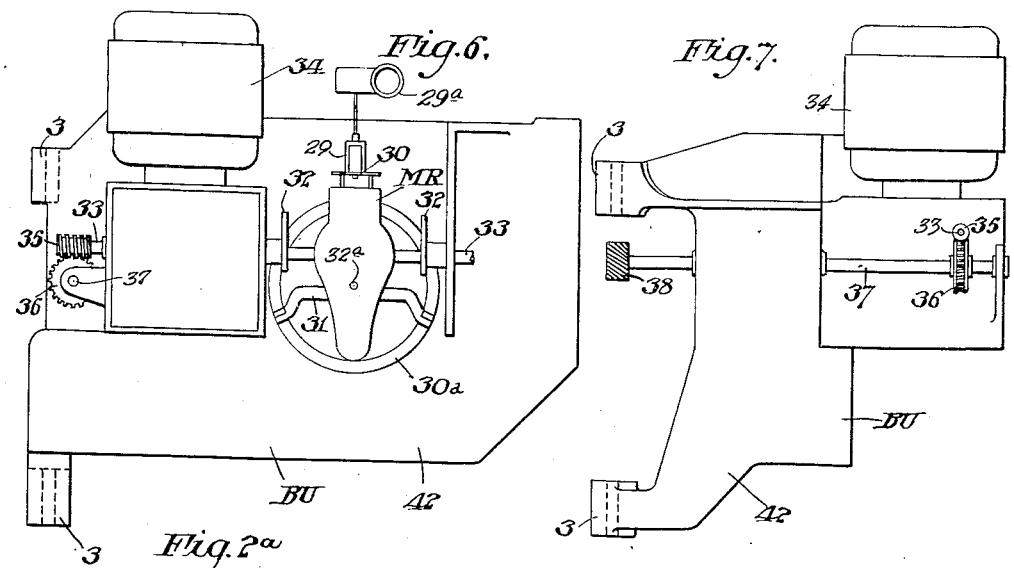

Patented July 26, 1938

2,124,832

UNITED STATES PATENT OFFICE 2,124,832

EXHIBITING INSTRUMENT

William R. Schofield, Jr., Philadelphia, Pa., assignor to Leeds and Northrup Company, Philadelphia, Pa., a corporation of Pennsylvania Application July 24, 1935, Serial No. 32,834

4 Claims. (Cl. 234—71)

My invention relates to apparatus for indicating, recording the magnitude or changes in magnitude of a condition, and more particularly to apparatus of the type having a sensitive element responsive to changes in magnitude of a condition, and a self-balancing system controlled thereby to effect movement of indicating and/or recording structure.

In accordance with one aspect of my invention, a rotatable indicator, a rotatable chart and a marker for the chart are carried by a movable frame to form a unit which, when in operating position, provides for driving of the chart by a suitable motor and for operative association of the indicator and marker with the relay of the instrument.

My invention further resides in the features of construction, combination and arrangement hereinafter described and claimed.

For an understanding of my invention reference is to be had to the accompanying drawings, in which:

Figure 1 is a front elevational view, with parts broken away, of an indicating-recording instrument;

Fig. 2 is a plan view, in section, of recording and indicating elements appearing in Fig. 1;

Fig. 2a is a detail view, on enlarged scale, of parts appearing in Fig. 2;

Fig. 3 is a plan view of the operating mechanism for the indicating-recording mechanism;

Fig. 4 is a rear elevational view of the indicating-recording unit shown in Fig. 2;

Fig. 5 is a detail view of parts appearing in Figs. 1, 2 and 4;

Figs. 6 and 7 are, respectively, rear and side elevational views of the operating mechanism shown in Fig. 3.

Referring to Figs. 1 and 2, the casing 1 is provided at the right-hand side with lugs 2 for receiving the hinge pins for the pivoted frame 4. As more clearly appears in Figs. 2 and 4, the central portion of the frame member 4 provides a bearing for the hollow shaft 5, to one end of which is secured the gear 6 and the other end of which is secured to or integral with the driving plate 7 for a recorder chart C which is held against plate 7 by the clamping nut 9. The gear 6 is in mesh with gear 10 driven by worm 11 on one end of shaft 12 to which is attached the gear 13 which engages the worm 14 on shaft 15 which extends through the upper lug 16 of the frame 4 and upper hinge lug 2 of the casing 1. Gears 6, 10, 11, 13 and shaft 12 are carried by the frame member 4 and form a unit which, when positioned in the casing, effects a driving connection between the chart C and the shaft 15.

The member 17 (Figs. 1, 2, 4 and 5) is supported by the frame member 4 for pivotal movement about the pins 18, 18. Member 17, as shown in Figs. 1 and 2, extends in front of the chart C and provides a bearing for the rotatable member 19 which, when the unit 4 is in position, and the member 17 swung to the position shown in Fig. 2, is coaxial with the shaft 20 which, as hereinafter appears, is rotated in accordance with the changes in magnitude of a condition, as temperature, pressure, flow, etc. To the rotatable member 19 is suitably secured the pointer P adapted to cooperate with the scale S which may, as shown in Fig. 2, be secured to the cover 21 of the instrument which, as appears in Fig. 1, is hinged at 8, 8 to the left-hand side of the casing 1. The rotatable member 19 is disengageably connected to the rotatable shaft 20 as by the bolt 22, so that when the parts are in the normal operating position shown in Fig. 2, the pointer P will follow the changes in magnitude of the condition under measurement and indicate its instantaneous values.

The rotation of the shaft 20 is communicated to the marker M for chart C by the cord 23 which, as most clearly shown in Fig. 5, passes over the idler pulley 24 whose shaft is carried by the member 17 near the pivoted end thereof, over pulley 25 secured to or integral with the rotatable member 19, and the idler pulley 26. Preferably, the carriage for the marker or pen is guided by the rod 28 spaced from and carried by the member 17 which is disposed so that the tip of the marker moves radially of the chart C.

The frame 4 and the elements described above as being carried by it, constitute an indicating-recording unit RI using a rotatable indicator and circular chart which may be used interchangeably with the strip-chart, linear indicating unit disclosed in Ross et al. application Serial No. 714,546, filed March 8, 1934, now U. S. Patent No. 2,074,118, dated March 16, 1937. The present unit is preferred when visibility of the indicator is of primary importance and high accuracy or readibility of the record is of secondary importance.

The basic unit BU of the instrument, which includes the mechanism for operating shaft 20 in accordance with the changes in magnitude of a condition, may be of the step-by-step type such as shown in Squibb Patent No. 1,935,732, or of the continuous adjustment type such as disclosed in Williams' application Serial No. 634,425 filed September 22, 1932, or Williams et al. application Serial No. 602,424, filed April 1, 1932, and is preferably also pivotally mounted within the casing 1 and for movement about the same axis as the indicating-recording unit RI. The lugs 3, 3 of the frame 42 of the unit BU (Figs. 6 and 7) rest upon the lugs 2, 2 of the casing (Fig. 1).

As shown, the mechanical relay mechanism MR, Figs. 3 and 6, is of the type fully disclosed in the aforesaid Squibb Patent 1,935,732 and to which reference is made for a detailed description thereof. Therefore, only selected representative parts of that mechanism have been shown and briefly described. Thus it will be seen the motor 34, through a worm gear and cooperating gear (not shown), drives shaft 33 (Fig. 3) and through worm gear 35 and gear 36 (Fig. 7) drives shaft 37 and gear 38; the latter, through gear 39 (Fig. 1), worm gear 14 and gear 13 (Fig. 4), drives shaft 12, worm gear 11, gears 10 and 6, hollow shaft 5 (Figs. 2 and 4) and the chart-driving member 7. The shaft 20 is rotated by or under the control of the mechanical relay MR. Its detector 29, for example, shown as a galvanometer responsive to unbalance of an electrical system or network, has a deflecting member 30 whose deviation from a neutral position in response to change in magnitude of a condition causes corresponding rotation of the shaft 20. By turning knob 29a the deflecting member 30 may be adjusted to its zero position. Upon the disc 46 secured to shaft 20 is a slide-wire or resistance W engaged by a fixed contact, not shown, and included in balanceable network, such as a potentiometer or a Wheatstone bridge, which also includes galvanometer 29 and a suitable condition-responsive device, as a thermocouple, a resistance-thermometer coil, or an ion-concentration cell, etc. for producing an electrical effect which is a function of the magnitude or change in magnitude of the condition under measurement. The deflection of member 30 from neutral position, as more fully explained in the aforesaid Squibb Patent No. 1,935,732, causes the driving clutch member 31, while out of engagement with the driven clutch member 30a, to be swung about the pivot 32a in one direction or the other depending upon the sense of deflection of member 30 and to an extent depending upon the angle of deflection. Thereafter, and while the clutch members 30a, 31 are in engagement, one or the other of the cams 32 on shaft 33 driven by motor 34 engages the member 31 and restores it to its neutral position shown in Fig. 6. Since the clutch members 30a, 31 are in engagement during this movement, the shaft 20, to one end of which the clutch disc 30a is secured, is rotated in a sense and to an extent determined by the sense and extent of deflection of the member 30. Upon a change in magnitude of the condition under measurement, the galvanometer 29 responds to effect a rebalancing adjustment of slidewire W by causing operation of shaft 20 as above described.

To shaft 33, driven by motor 34, is attached the worm gear 35 which meshes with gear 36 on shaft 37 near the rear of the unit BU and on which, adjacent the common pivotal axis of the units RI and BU, is secured the gear 38 in mesh with the gear 39 on the lower end of the shaft 15 which is coaxial with or may serve as the upper hinge pin for the two units, and to whose upper end, as previously described, is attached the worm 14 for driving the recorder chart C.

As shown in Fig. 3, the unit BU may be maintained in proper position within the casing 1 by the screw 40 which passes through the extension 41 of the frame 42 of the unit BU and threadably engages the lug 43 extending from the interior of the casing 1. When the instrument is to be of the round-chart rotatable-indicator type, the unit RI (Fig. 4) is added to the basic unit (Fig. 3). The mounting of the unit effects the driving connection between the motor 34 and the chart driving disk 7 by effecting engagement of gear 13 of unit RI with worm 14. When the unit RI is swung into position, it effects axial alignment of shaft 20 with the rotatable element 19 for the indicator and the marker. By turning the bolt 22, the indicator and marker are operatively connected to the shaft 20, and when the cover 21 is swung to position an annular scale S is brought into position coaxial with the pointer or indicator P. As appears from Fig. 1, the chart C is visible through the circular opening afforded by the scale S. The window 48 is held in the recess in the back of cover 21 by the scale S; preferably a gasket 49 of suitable resilient material is interposed between the margin of the window and the cover 21.

When it is desired to replace the chart C, the cover 21 is swung open, the bolt 22 is loosened to permit the arm 17 to be swung in clockwise direction about its pivot as viewed in Fig. 2, whereupon the nut 9 may be removed and a new chart mounted. By reversal of this sequence of operations, the marker and indicator are again coupled to shaft 20 and the scale S brought into proper relation with respect to the indicator P. Proper position of the indicator P with respect to shaft 20 is ensured as by an interlocking connection comprising lug 20a of shaft 20 which extends into recess 19a of the member 19, Fig. 2a. Further, since the basic unit BU and the recording-indicating unit RI have a common pivotal axis, they may both be swung as a unit with respect to the casing without disturbance of the operative conditions between them to afford access to and inspection of all parts of the mechanism while in operation or operative relation. The two units may be held in proper relative position as a unit by a bolt or other suitable clamping means which passes through the lug 44, Fig. 4, of the recording-indicating unit, and lug 45, Fig. 3, of the basic unit.

While I have illustrated and described a preferred arrangement, it is to be understood my invention is not limited but is coextensive in scope with the appended claims.

What I claim is:

1. An instrument of the character described comprising a rotatable shaft, means for actuating said shaft responsive to the changes in magnitude of a condition, a frame pivoted to swing about an axis substantially at right angles to said shaft, a scale carried by said frame, a member pivotally mounted on said frame and extending in front of said scale, a rotatable element carried by said member and in axial alignment with said shaft when said frame and said member are in predetermined positions, means for disengageably connecting said rotatable shaft to said rotatable element, and means connected to said rotatable element for movement in cooperative relation with said scale.

2. An instrument of the character described comprising a rotatable shaft, means for actuating said shaft responsive to the changes in magnitude of a condition, a frame pivoted to swing about an axis substantially at right angles to said shaft, a rotatable chart detachably carried by said frame and rotating coaxially with said shaft when said frame is swung to normal position, a member pivotally mounted on said frame and normally extending in front of said chart, a rotatable element carried by said member and in axial alignment with said shaft when said frame and said member are in normal positions, means for disengageably interlocking said rotatable shaft and said rotatable element to form a driving connection therebetween, and a marker for said chart driven by said rotatable element.

3. An instrument of the character described comprising a rotatable shaft, means for actuating said shaft responsive to the changes in magnitude of a condition, a chart disposed in a plane normal to the axis of said shaft, a frame pivoted to swing about an axis substantially at right angles to said shaft, a member pivotally mounted on said frame, a rotatable element carried by said member centrally of said chart when said frame and said member are in normal positions, a marker operatively connected to said element for cooperation with said chart when said frame and said member are in normal positions, and means forming a disengageable driving connection between said rotatable shaft and said rotatable element.

4. An instrument of the character described comprising a casing, a motor within said casing, means within said casing and including a shaft rotatable in accordance with changes in magnitude of a condition, a unit, pivoted with respect to said housing and said shaft, comprising a rotatable chart whose axis is parallel to that of said shaft when said unit is swung to normal position, a supporting member pivoted to said unit and extending in front of said chart, a marker slidably mounted on said supporting member, a driven member therefor coaxial with said chart when said unit and said supporting member are swung to their respective normal positions, and releasable means engaging said shaft and said driven member to form a driving connection therebetween, said unit and said supporting member upon release of said driving connection being pivotally movable away from and into cooperative relation with said shaft.

WILLIAM R. SCHOFIELD, Jr.